(12) United States Patent
Krauer et al.

(10) Patent No.: US 9,689,718 B2
(45) Date of Patent: Jun. 27, 2017

(54) ELEMENT, PREFERABLY A CLOSURE ELEMENT FOR INSERTING INTO A BORE IN A COMPONENT

(75) Inventors: Jürg Krauer, Uster (CH); Robert Hollinger, Russikon (CH)

(73) Assignee: SFC KOENIG AG, Dietikon (CH)

( * ) Notice: Subject to any disclaimer, the term of this patent is extended or adjusted under 35 U.S.C. 154(b) by 315 days.

(21) Appl. No.: 14/375,169

(22) PCT Filed: Feb. 1, 2012

(86) PCT No.: PCT/EP2012/000443
§ 371 (c)(1),
(2), (4) Date: Sep. 19, 2014

(87) PCT Pub. No.: WO2013/113327
PCT Pub. Date: Aug. 8, 2013

(65) Prior Publication Data
US 2015/0000431 A1    Jan. 1, 2015

(51) Int. Cl.
*G01D 11/24* (2006.01)
*F16L 41/00* (2006.01)
*F16L 55/11* (2006.01)
*G01D 11/30* (2006.01)

(52) U.S. Cl.
CPC .......... *G01D 11/245* (2013.01); *F16L 41/008* (2013.01); *F16L 55/11* (2013.01); *G01D 11/30* (2013.01)

(58) Field of Classification Search
CPC .................................................. G01D 11/245
USPC ........................................................ 73/866.5
See application file for complete search history.

(56) References Cited

U.S. PATENT DOCUMENTS

| 3,448,611 A | * | 6/1969 | Lebourg | ................ | E21B 49/081 |
| | | | | | 166/264 |
| 6,708,978 B2 | | 3/2004 | Kagi | | |
| 2002/0135359 A1 | * | 9/2002 | Steinich | ................ | G01B 7/003 |
| | | | | | 324/207.13 |
| 2003/0151204 A1 | | 8/2003 | Kagi | | |

(Continued)

FOREIGN PATENT DOCUMENTS

| CA | 2843635 A1 | 2/2013 |
| DE | 102006003047 A1 | 7/2007 |

(Continued)

OTHER PUBLICATIONS

Abstract of DE 102006003047.

*Primary Examiner* — Walter L Lindsay, Jr.
*Assistant Examiner* — Philip Marcus T Fadul
(74) *Attorney, Agent, or Firm* — Brian Roffe

(57) ABSTRACT

An element is provided in particular as a closure element or fastening element for inserting into a bore in a component, such as into a bore in an engine, a valve block, a hydraulic unit or a container. At least one electric element which is arranged in or on the element is provided, wherein each electric element transmits and/or receives electric signals. In the fitted state, the electric element is advantageously positioned such that the electric element is adjacent to the chamber formed in the bore and is therefore in contact, for measuring purposes or the like, with the medium contained in the bore. In addition to the actual sealing and/or fastening function, the element can therefore be used to undertake one or more measurements, etc.

20 Claims, 6 Drawing Sheets

(56) References Cited

U.S. PATENT DOCUMENTS

| | | |
|---|---|---|
| 2004/0084099 A1 | 5/2004 | Miura |
| 2008/0314468 A1 | 12/2008 | Houghton |
| 2013/0312859 A1 | 11/2013 | Seiffert et al. |
| 2013/0327769 A1 | 12/2013 | Wust et al. |

FOREIGN PATENT DOCUMENTS

| | | |
|---|---|---|
| WO | 2009000317 A1 | 12/2008 |
| WO | 2009000559 A1 | 12/2008 |
| WO | 2013113327 A1 | 8/2013 |

\* cited by examiner

ELEMENT, PREFERABLY A CLOSURE ELEMENT FOR INSERTING INTO A BORE IN A COMPONENT

FIELD OF THE INVENTION

The invention relates to an element, preferably a closure element for inserting into a bore in a component.

BACKGROUND OF THE INVENTION

Such closure or fastening elements for inserting into a bore, for example, in an engine, with a sleeve-shaped base body that can be inserted into the bore and with a splaying body that can be braced in the bore are known. Closure elements of this type are inserted, in particular as mass-produced items, into bores with different diameters and internal pressures for the purpose of sealing. Depending on the size of the bore and the strength of the effective internal pressure very different embodiments are produced, as disclosed for example in U.S. Pat. No. 6,708,978 B2. The closures described here are in the form of one-part closure discs. They are therefore easier to produce technically than multi-part closures, as described for example in publication WO 2009/000317 A1.

OBJECTS AND SUMMARY OF THE INVENTION

Proceeding from these known elements, the object forming the basis of the invention is to devise an element which can easily perform at least one additional function of measurement, data transfer, analysis and/or the like.

According to the invention, this object is achieved in that at least one electric element which is arranged in or on the element is provided, the respective electric element transmitting and/or receiving electric signals.

With this element according to the invention, in addition to the actual sealing and/or fastening function, one or more measurements etc. of the medium in the component and/or of the component can be undertaken without the fitting or the reliable long-term sealing of the element being impaired.

In one very advantageous embodiment the electric element is integrated into the splaying body of the element, the splaying body being able to be pressed into a sleeve-shaped base body that can be inserted into the bore.

Very advantageously, the electric element has a housing which is held with form fit in the splaying or in the base body or in the bore.

Depending on the application, the electric element is a sensor, an actuator, a transducer, a chip, a measuring converter or the like, it being provided with at least one line connection and/or transmitting and receiving radio signals. Ideally, the electric element is in the form of an autonomous element.

In comparison to today's most widely used installation techniques for sensors which are screwed or plugged in, the advantage of the fastening element according to the invention is that the element guarantees a permanently sealed seat and so increases reliability and protection against mechanical, climatic or chemical stresses. The combination of the closure and the sensor element is also more advantageous in relation to size, weight and cost.

BRIEF DESCRIPTION OF THE DRAWINGS

Exemplary embodiments of the invention and further advantages of the latter are described in more detail below by means of drawings. These show.

DETAILED DESCRIPTION OF THE INVENTION

Figure 1:
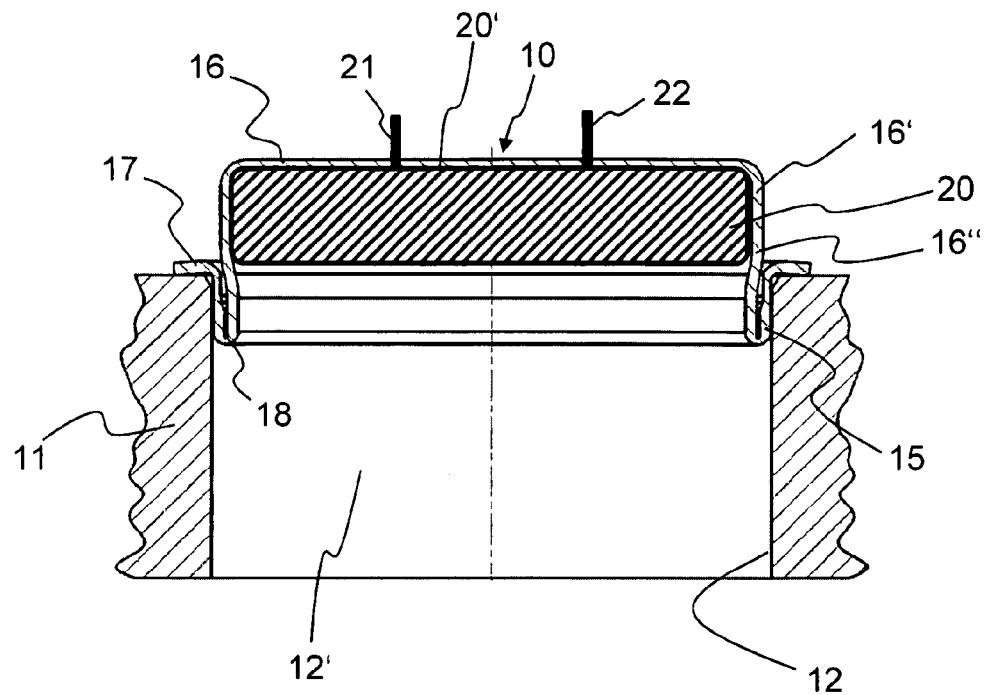
FIG. 1 is a section of a one-piece element according to the invention in a bore in the non-installed state.
Figure 2:
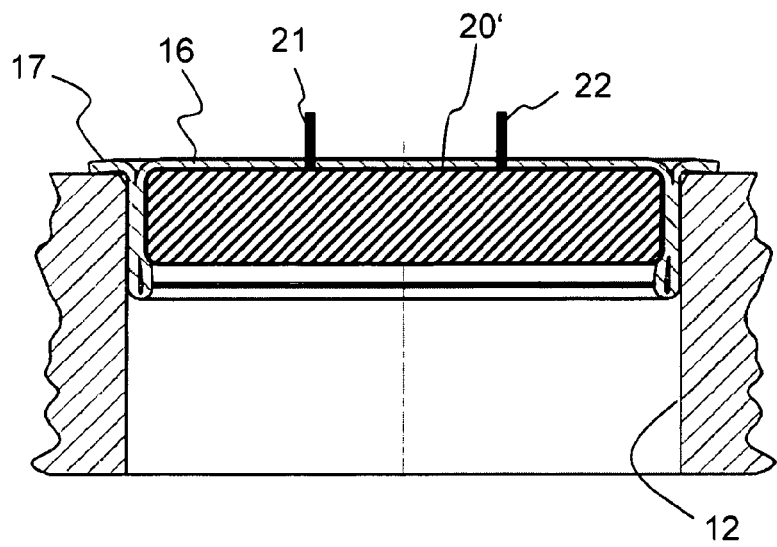
FIG. 2 is a section of the element according to FIG. 1 in the fitted state.

FIG. 1 and FIG. 2 show an element 10 which serves as a closure element for inserting into a bore 12 in a component 11, it preferably being inserted into a bore in an engine, a valve block, a hydraulic unit or a container.

The element 10 is made in one piece and is made up of a sleeve-shaped base body 15 that can be inserted into the bore 12 and the outer circumference of which in the installed state lies tight against the inner surface of the bore 12 and of a splaying body 16 that can brace this base body 15 in the bore 12. The base body 15 with a supporting flange 17 lying against the component 11 is connected to the splaying body 16 by a bent cross-over region 18 in the end projecting into the bore.

According to the invention an electric element 20 disposed in the splaying body 16 is provided which transmits and/or receives electric signals, two electric connections 21, 22 for this being indicated, which can be connected to an evaluating device or the like, not detailed, from outside of the component 11. The electric element 20 has a housing 20' which is held, preferably with form fit, in the interior of the hat-shaped splaying body 16.

As illustrated diagrammatically in FIG. 2, in the fitted state the electric element 20 is positioned such that it is adjacent to the chamber 12' formed in the bore 12, and so is in contact with the medium contained in the bore for measuring purposes or the like. It is located here in the splaying body 16 and also within the base body 15.

Needless to say, this electric element 20, illustrated diagrammatically here, can also be made in the form of a plate or in some other form, and its electric connections 21, 22 can be provided in different numbers or arranged differently than shown.

Depending on the application, a sensor, an actuator, a transducer, a chip, a measuring converter or the like can be used for the electric element 20. For example, the pressure and/or the temperature of the medium in an engine block as a component 11 can be determined permanently or by controlled retrieval.

The electric element 20 in the splaying body 16 has an outer diameter such that the latter corresponds approximately to the inner diameter of the splaying body 16 in the fitted state. In the non-installed state there is formed in the wall 16' of the splaying body 16 a cross-over 16" which divides the wall 16' into an outside and an inside section. The outer diameter of the outside section is larger here than the outer diameter of the inside section, and in particular is also slightly larger than the graduated inner diameter of the sleeve-shaped base body 15 in which a reduction in diameter taking place towards the bore 12 is provided. It is thus made possible for the splaying body 16 to produce a permanent contact force against the base body 15 that acts radially outwards when being pushed in and in the fitted state.

Furthermore, upon pushing in plastic deformation takes place in the annular cross-over region 18 between the splaying and the base body, whereby this bulge-like cross-over region 18 is displaced into the bore.

Figure 3:
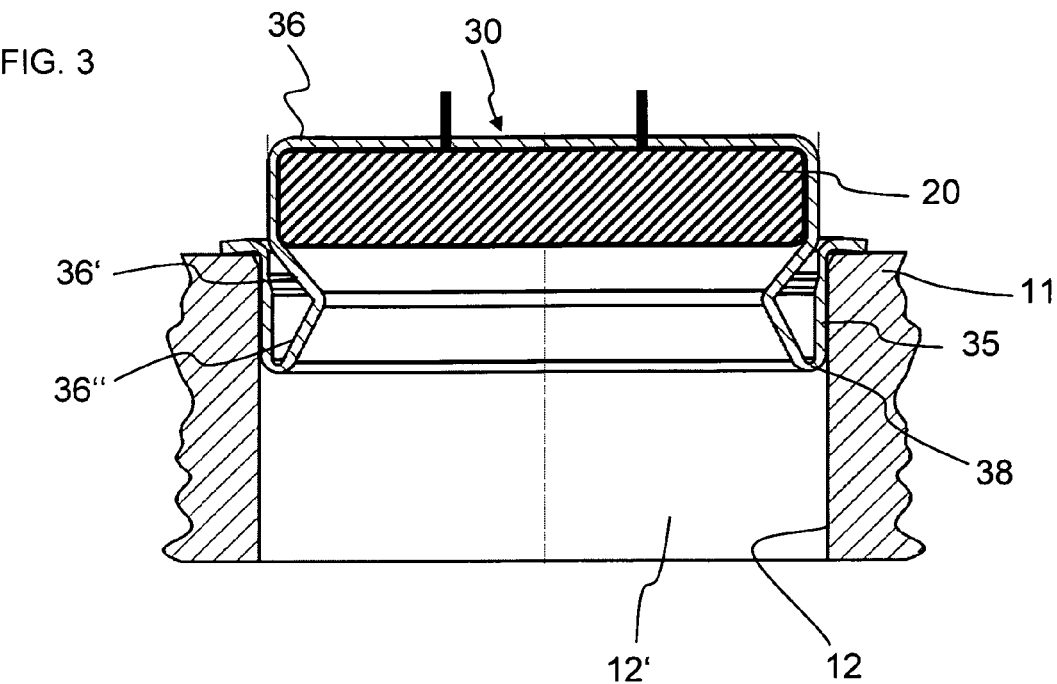
FIG. 3 is a section of a similar version of a one-piece element in the non-installed state.
Figure 4:
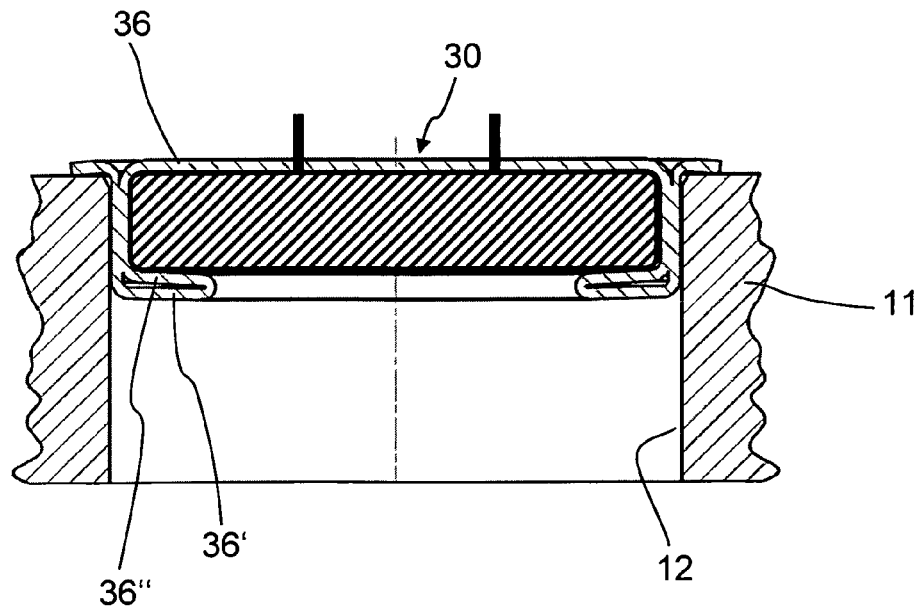
FIG. 4 is a section of the element according to FIG. 3 in the fitted state.

FIG. 3 and FIG. 4 illustrate an element 30 which, similarly to the element 10 according to FIG. 1 and FIG. 2, is also made in one piece, and so in the following only the different form of its splaying body 36 in the region that is deformed is described. Thus, the element 30 is made up of a sleeve-shaped base body 35 that can be inserted into the bore 12 and the outer circumference of which in the installed state lies tight against the inner surface or wall of the bore 12 and of the splaying body 36 that can brace this base body 35 in the bore 12.

According to the invention an electric element 20 is integrated into this splaying body in the same way as in the element 10.

Two sleeve-like arms 36', 36", that in the unfitted state, as illustrated in FIG. 3, form an angle, are assigned to the splaying body 36 beneath the electric element 20. Upon pushing in the hat-shaped splaying body 36 the upper arm 36' is bent round beneath the electric element 20, however the lower arm 36" is bent round in the cross-over region 38. Consequently, in the fitted state they lie on top of one another around 180° and serve as the lower stop of the electric element 30. The latter is therefore once again in direct contact with the medium located within the chamber 12' and the properties of the latter, such as for example pressure, temperature etc. can be measured.

These elements 10, 30 described above are described in detail in patent application PCT/EP2011/004225 and reference is therefore made to this application.

Figure 5:
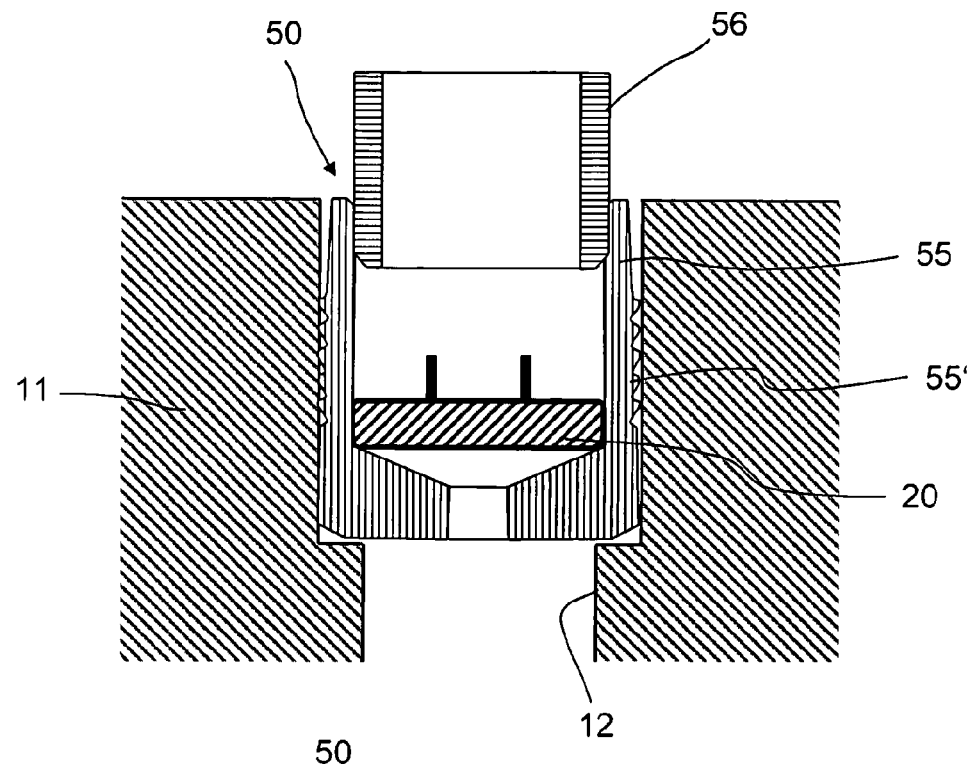
FIG. 5 is a section of a further version of an element according to the invention with an electric element disposed in the base body in the pre-fitted state.
Figure 6:
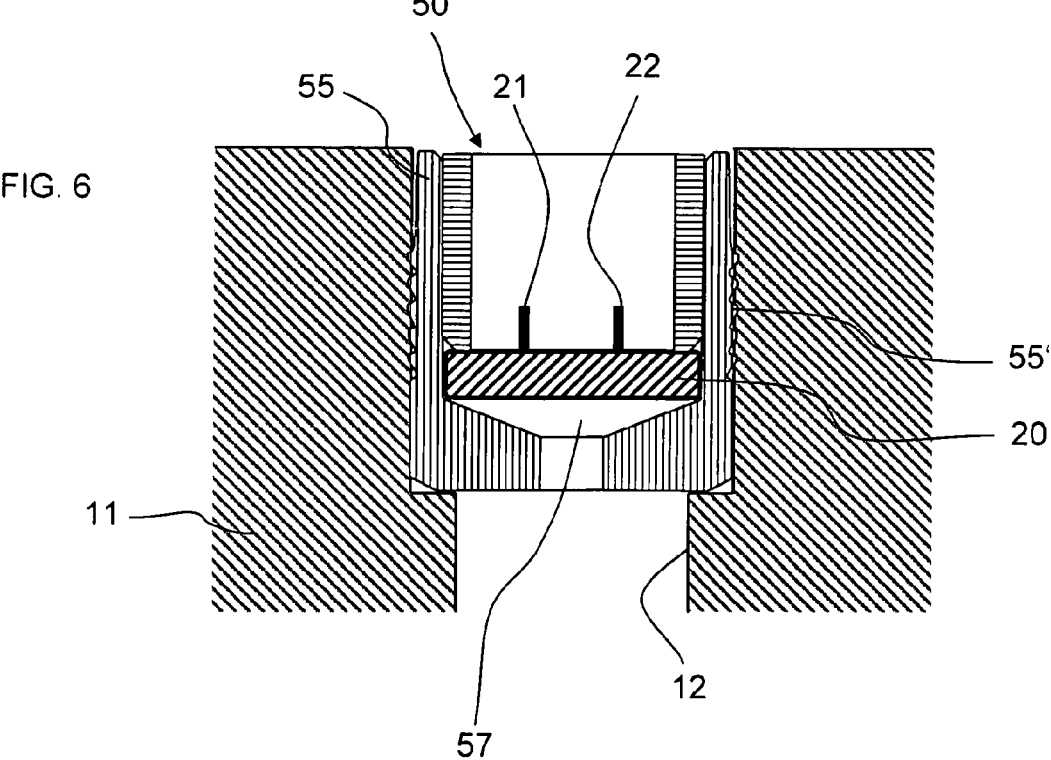
FIG. 6 is a section of the element according to FIG. 5 in the fitted state.

An element 50 according to FIG. 5 and FIG. 6 comprises a base body 55 positioned in a graduated bore 12 and a separate sleeve-shaped splaying body 56 that can be pushed into said base body 55. Said splaying body 56 is pushed in in such a way that the base body 55 is pressed radially outwards against the inner wall of the bore 12 and is pushed in with its projecting annular outer ribs 55' or the like into the material of the bore wall with plastic deformation for reliable holding and sealing.

According to the invention this element 50 is characterised in that, unlike the exemplary embodiments according to FIG. 1 to FIG. 4, the electric element 20 is disposed in the base body 55 which is advantageously also in the shape of a sleeve so that the electric element 20 fastened in the latter can, as it were, be in contact with the medium located in the bore. The lower opening 57 of the base body 55 is preferably provided with a funnel shape so that the electric element 20 is advantageously exposed to the medium over its entire lower side. As can be seen in FIG. 6, the splaying body 56 pushed into the base body 55 comes to rest with its lower face side on the upper side of the electric element 20, by means of which the latter is permanently fixed.

As one feature, provision is also made such that the electric element 20 performs a sealing function for this closure element 50 because both the splaying and the base body are made in the form of a sleeve. One is thus offered the advantage that the electric connections 21, 22 of the electric element 20 are freely accessible from the outside. In principle, the splaying body 56 could however also be closed at the top.

Figure 7:
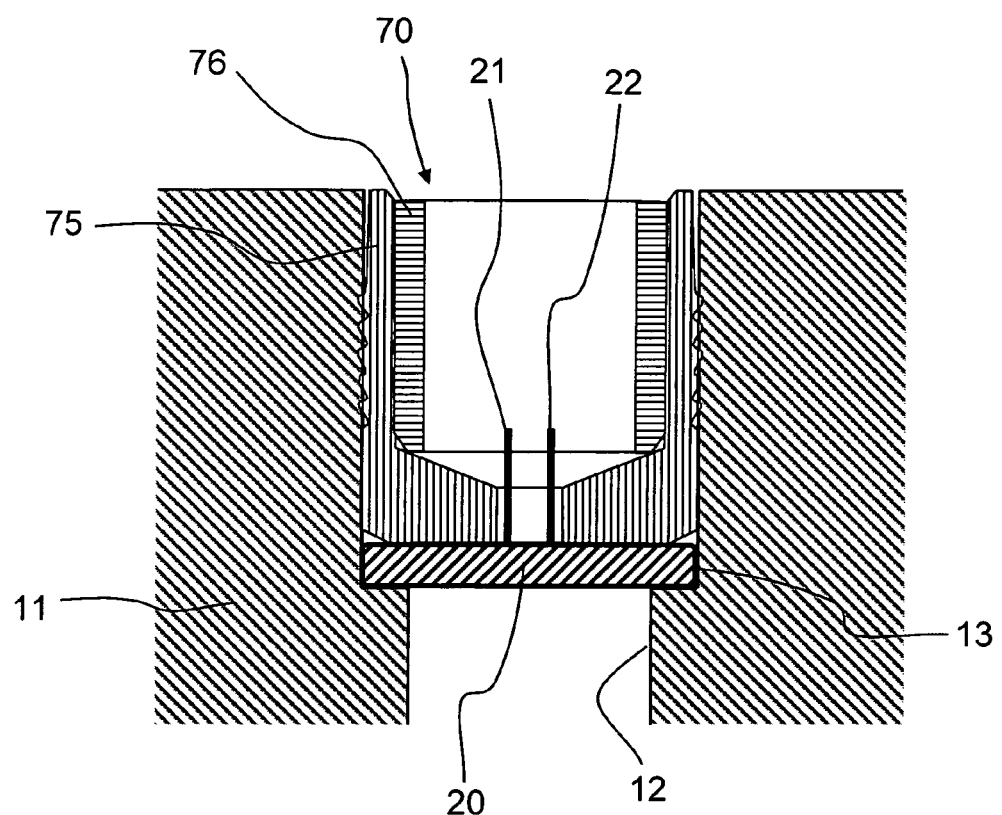
FIG. 7 is a section in a further version of an element in the fitted state wherein the electric element is placed beneath the element.

An element 70 according to FIG. 7 is in itself made in the same way as the element 50 described above, and so not all of the details will be described again in the following. The difference according to the invention is that the electric element 20 is fixed directly in the bore beneath the element 70. For this purpose the bore 12 is provided with a bore 13 extended by a shoulder and in which the electric element 20 is positioned with accurate fitting. Used as a fixing for the latter is the element 70 fastened in the extended bore 13 with the base body 75 and the splaying body 76 pushed into the latter which are both made in the form of a sleeve and the electric connections 21, 22 extend through the latter for an external connection.

Figure 8:
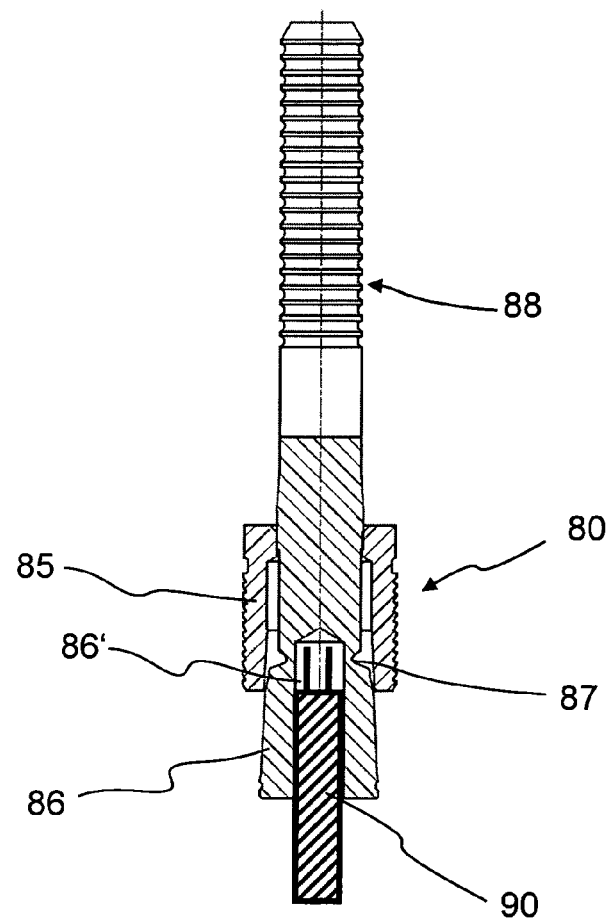
FIG. 8 is a section of a version of an element according to the invention in the pre-fitted state.
Figure 9:
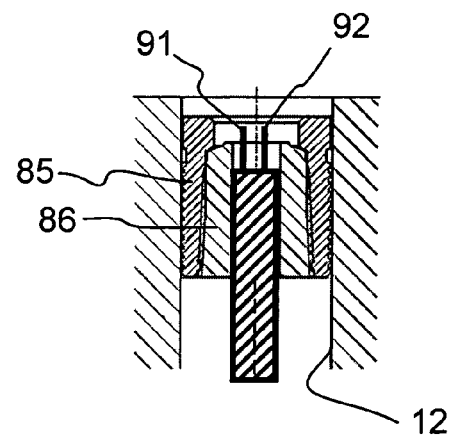
FIG. 9 is a section of the element according to FIG. 8 in the fitted state.

FIG. 8 and FIG. 9 show a further exemplary embodiment of an element 80 which comprises a base body 85 and a splaying body 86, the splaying body 86 being connected to a tension bolt 88 via a predetermined breaking point 87. The splaying body 86 and the base body 85 put over the latter can be positioned together in the bore 12. By means of a force applied to the tension bolt 88 and so to the splaying body 86 away from the component 11 with shearing off of the predetermined break point 87 it can be pushed into the base body 85 so that the splaying body 86 presses the base body 85 tightly against the wall of the hole to be closed by generating a radial pressure on the inner wall of the base body 85.

Within the framework of the invention an electric element 90, also shown diagrammatically, is disposed in an opening 86' of the splaying body 86. This opening 86' in the splaying body 86 for receiving the electric element is of such a length that the opening 86' extends through the predetermined breaking point 87 and so, after the shearing off, a continuous opening is produced in the splaying body 86 by means of which the electric element 90 inserted tightly in the splaying body 86 is adjacent to the chamber formed in the bore 12 towards the inside and has electric connections 91, 92 leading away towards the outside.

Figure 10:
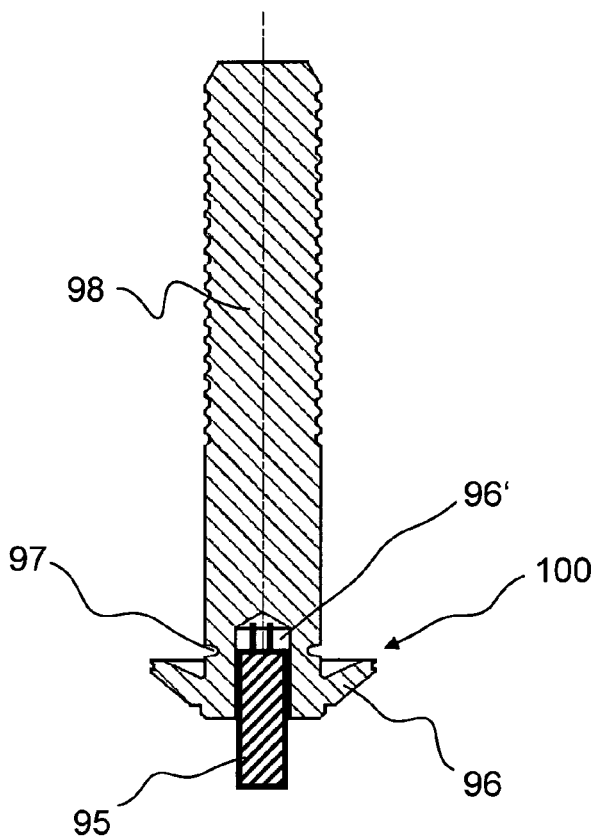
FIG. 10 is a section of an element of a similar version as in FIG. 8 in the non-installed state.
Figure 11:
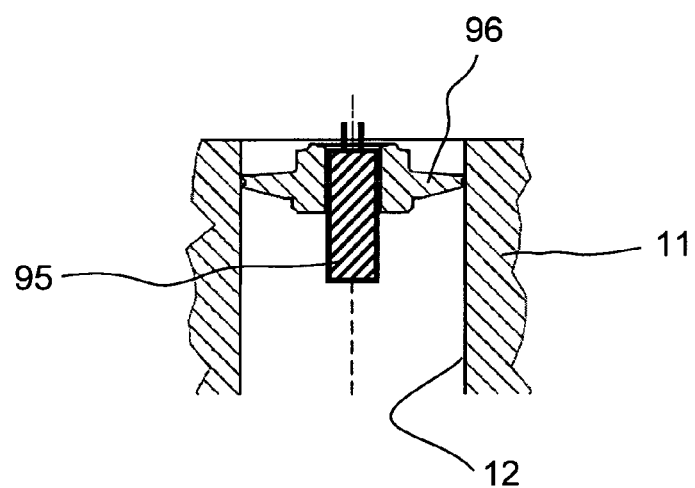
FIG. 11 is a section of the element according to FIG. 10 in the fitted state.

FIG. 10 and FIG. 11 illustrate a further exemplary embodiment of an element 100 which, similarly to that of FIG. 8, comprises a predetermined breaking point 97 of a one-part closure disc 96 as a head part of a tension bolt 98 that can be stressed to provide tension. The closure disc 96 can be splayed by an axial force in the tension bolt 98 and can thus be pressed radially against the inner wall of the bore 12 of the component 11 to be closed.

According to the invention an electric element 95 is disposed in an opening 96' of the closure disc 96, which electric element 95 is in turn shown diagrammatically. This opening 96' for receiving the electric element is of such a length that it extends through the predetermined breaking point 97 and so, after the shearing off, a continuous opening is produced in the closure disc 96 by means of which the electric element 95 inserted tightly into the latter is adjacent to the chamber formed in the bore 12 towards the inside and has electric connections leading away to the outside.

This closure element 100 described above is the subject matter of patent application PCT/EP2011/000663 and so reference is made to this application.

The invention is sufficiently demonstrated by the exemplary embodiments described above. However, it could also be disclosed by other versions. Thus, two or even more such electric elements could be integrated into a closure element, for example by the one electric element being integrated into the base or splaying body and the second being positioned beneath the base body, this second electric element also being able to be annular in form. The other element disposed above the latter could be cylindrical or of a similar form so that there would also be a connection to the inside of the engine etc. in order to measure e.g. with one the temperature and with the other the pressure of the medium in the chamber.

Furthermore, in the fitted state the electric element could not be directly adjacent to the chamber formed in the bore, but could for example project into the bore or into the interior of the component by means of a line with a sensor or the like.

Moreover, within the framework of the invention there is a further advantage in that the electric element can be replaced if it is defective or is to be replaced by a different one. Thus, for example, the element 10, 30 according to FIG. 2 or FIG. 4 could be removed from the bore 12 by a removal device and a new element could be fitted with a new electric element. With the element 80 the splaying body 86 could be pushed with the electric element 90 into the bore and then, likewise after removing the base body 85, a new element with a new electric element could be inserted.

Generally, the bore 12, the respective element and so also the electric element is formed with a round cross-section. Theoretically however, a rectangular or polygonal cross-section could also be provided in these elements.

The invention claimed is:

1. A closure or fastening element for inserting into a bore in a component, comprising:
   a base body insertable into the bore;
   a splaying body that braces the base body when present in the bore and defines an opening;
   at least one electric element arranged at least partly in the opening of the splaying body, each of the at least one electric element transmitting and/or receiving electric signals; and
   a tension bolt connected to the splaying body via a predetermined breaking point that enables the tension bolt to separate from the splaying body when the base body is present in the bore.

2. The element according to claim 1, wherein the bore includes a chamber, the splaying body being configured such that the at least one electric element is adjacent the chamber when the base body is present in the bore and is adapted to come into contact with any medium in the bore.

3. The element according to claim 1, wherein the base body has an outer circumferential surface, which when the base body is present in the bore, lies against an inner surface of the bore, and the base body is sleeve-shaped.

4. The element according to claim 1, wherein the at least one electric element is integrated into the splaying body.

5. The element according to claim 1, wherein each of the at least one electric element comprises one of a sensor, an actuator, a transducer, a chip, and a measuring converter, the at least one electric element including at least one line connection and/or configured to at least one of transmit and receive radio signals.

6. The element according to claim 1, wherein the tension bolt is configured such that by applying a force to the tension bolt, when the predetermined breaking point shears off and separates from the splaying body, the splaying body is positionable into the base body so that the splaying body is pressed tight against a wall of the bore to be closed by producing a radial pressure on an inner wall of the base body.

7. The element according to claim 6, wherein the opening in the splaying body for receiving the at least one electric element has a length such that this opening extends through the predetermined breaking point and so, after the shearing off, a continuous opening is produced in the splaying body by means of which the at least one electric element inserted tightly into the splaying body is adjacent to a chamber formed in the bore on one side and has electric connections leading away to the outside on an opposite side.

8. The element according to claim 1, wherein the at least one electric element is configured to perform a sealing function of the closure element.

9. The element according to claim 1, wherein the splaying body is in the form of a sleeve.

10. The element according to claim 1, wherein the base body is in the form of a sleeve.

11. The element according to claim 1, wherein the splaying body and the base body are each in the form of a sleeve.

12. The element according to claim 1, wherein the base body is configured to extend around and exterior of an outer circumferential surface of the splaying body.

13. The element according to claim 1, wherein the base body is configured to be put over the splaying body when both the base body and splaying body are present in the bore.

14. The element according to claim 1, wherein the opening in the splaying body extends through the predetermined breaking point to join with an open area of the tension bolt such that the opening is exposed after the tension bolt separates from the splaying body.

15. The element according to claim 14, wherein the at least one electric element has at least one line connection extending into the opening.

16. A closure or fastening element for inserting into a bore in a component, comprising:
    a closure disc insertable into the bore, the closure disc having an opening;
    a tension bolt coupled to the closure disc and having a predetermined breaking point adjacent the closure disc, the closure disc being configured to be splayed by an axial force in the tension bolt and thereby being able to be pushed radially against an inner wall of the bore to be closed when the closure disc is present in the bore and the tension bolt is coupled to the closure disc, and the tension bolt being separable from the closure disc at the predetermined breaking point; and
    an electric element arranged at least partly in the opening of the closure disc.

17. The element according to claim 16, wherein the closure disc is a one-part closure disc constituting a head part of the tension bolt.

18. The element according to claim 16, wherein the opening in the closure disc is adjacent the tension bolt.

19. The element according to claim 16, wherein the electric element has at least one line connection extending into the opening.

20. The element according to claim 16, wherein the opening in the closure disc extends through the predetermined breaking point to join with an open area of the tension bolt such that the opening is exposed after the tension bolt separates from the closure disc.

\* \* \* \* \*